US012723117B2

(12) United States Patent
Gao et al.

(10) Patent No.: US 12,723,117 B2
(45) Date of Patent: Sep. 1, 2026

(54) ETHYLENE COPOLYMER AND METHOD FOR PREPARATION THEREOF AND COMPOSITION AND CROSSLINKED POLYMER AND TIRE

(71) Applicants: CHINA PETROLEUM & CHEMICAL CORPORATION, Beijing (CN); SINOPEC (BEIJING) RESEARCH INSTITUTE OF CHEMICAL INDUSTRY CO., LTD., Beijing (CN)

(72) Inventors: Nian Gao, Beijing (CN); Jianjun Chen, Beijing (CN); Hongbo Li, Beijing (CN); Lin Xu, Beijing (CN); Ning Wu, Beijing (CN); Jianguo Hao, Beijing (CN)

(73) Assignees: CHINA PETROLEUM & CHEMICAL CORPORATION, Beijing (CN); SINOPEC (BEIJING) RESEARCH INSTITUTE OF CHEMICAL INDUSTRY CO., LTD., Beijing (CN)

( * ) Notice: Subject to any disclaimer, the term of this patent is extended or adjusted under 35 U.S.C. 154(b) by 588 days.

(21) Appl. No.: 18/253,626

(22) PCT Filed: Nov. 27, 2020

(86) PCT No.: PCT/CN2020/132147

§ 371 (c)(1),
(2) Date: May 19, 2023

(87) PCT Pub. No.: WO2022/104877

PCT Pub. Date: May 27, 2022

(65) Prior Publication Data

US 2024/0010768 A1 Jan. 11, 2024

(30) Foreign Application Priority Data

Nov. 20, 2020 (CN) ........................ 202011311765.9
Nov. 20, 2020 (CN) ........................ 202011314968.3

(51) Int. Cl.

| | |
|---|---|
| ***C08F 210/02*** | (2006.01) |
| ***B60C 1/00*** | (2006.01) |
| ***C08F 4/659*** | (2006.01) |
| ***C08F 4/6592*** | (2006.01) |
| ***C08F 236/06*** | (2006.01) |

(52) U.S. Cl.

CPC .............. *C08F 210/02* (2013.01); *B60C 1/00* (2013.01); *C08F 4/65912* (2013.01); *C08F 4/65927* (2013.01); *C08F 236/06* (2013.01)

(58) Field of Classification Search

CPC .... C08F 210/02; C08F 236/02; C08F 4/6592; C08F 4/659; B60C 1/00
USPC .......................................................... 525/240
See application file for complete search history.

(56) References Cited

U.S. PATENT DOCUMENTS

| | | | | |
|---|---|---|---|---|
| 5,191,052 | A | 3/1993 | Welborn, Jr. | |
| 6,288,191 | B1 | 9/2001 | Nishiyama et al. | |
| 6,310,164 | B1 | 10/2001 | Morizono et al. | |
| 2003/0036610 | A1 | 2/2003 | Fusco et al. | |
| 2005/0154139 | A1 | 7/2005 | Ishihara et al. | |
| 2005/0239639 | A1 | 10/2005 | Monteil et al. | |
| 2012/0059134 | A1 | 3/2012 | Yang et al. | |
| 2012/0059135 | A1* | 3/2012 | Michiue | C08F 36/04 526/172 |
| 2013/0211023 | A1 | 8/2013 | Lee | |

FOREIGN PATENT DOCUMENTS

| | | | | |
|---|---|---|---|---|
| CN | 102356100 A | 2/2012 | | |
| CN | 102858808 A | 1/2013 | | |
| EP | 855413 A1 * | 7/1998 | | C08L 23/16 |
| EP | 2415792 A1 | 2/2012 | | |
| JP | S4834982 A | 5/1973 | | |
| JP | 2004018696 A | 1/2004 | | |
| JP | 2005306936 A | 11/2005 | | |

* cited by examiner

*Primary Examiner* — Deve V Hall
(74) *Attorney, Agent, or Firm* — NKL Law; Allen Xue

(57) ABSTRACT

An ethylene copolymer and a method for preparing same, and a composition, crosslinked polymer, and tire containing said ethylene copolymer are provided. The ethylene copolymer contains an ethylene structural unit derived from ethylene and a conjugated diene structural unit derived from a conjugated diene. Taking the total amount of said ethylene copolymer as the reference, the content of said conjugated diene structural unit is 25-45 mol %. The conjugated diene is formed by 1,2-polymerization and the content of 1,2-polymeric vinyl structural units having side chain double bonds is 20-40 mol %. Taking the total number of conjugated diene structural units in the ethylene copolymer as the reference. The total amount of said 1,2-polymeric structural units is 95 mol % or more, and the ethylene copolymer has a weight average molecular weight of 20,000 to 300,000.

20 Claims, No Drawings

ETHYLENE COPOLYMER AND METHOD FOR PREPARATION THEREOF AND COMPOSITION AND CROSSLINKED POLYMER AND TIRE

CROSS REFERENCE TO RELATED APPLICATIONS

This application is a U.S. national stage entry of PCT International Application No. PCT/CN2020/132147, filed on Nov. 27, 2020, which claims the benefits of priority to Chinese patent applications 202011311765.9 and 202011314968.3, filed on Nov. 20, 2020, the contents of which are incorporated herein by reference.

FIELD OF THE INVENTION

The present disclosure relates to an ethylene copolymer and a preparation method thereof, more particularly, the present disclosure relates to an ethylene copolymer comprising a structural unit derived from ethylene and a structural unit derived from a conjugated diene and a preparation method thereof; the present disclosure also relates to a composition comprising the ethylene copolymer and a crosslinked polymer comprising a unit derived from the ethylene copolymer; and the present disclosure further relates to a tire having at least one constituent element including the ethylene copolymer, the composition or the crosslinked polymer.

BACKGROUND OF THE INVENTION

Ethylene, as a widely used and easily available monomer, is widely used in the plastic industry. Conjugated dienes, particularly butadiene and isoprene, are the most important monomers for the synthesis of rubbers. Butadiene, as a by-product in a process of preparing ethylene by a petroleum route, used to have a price similar to that of ethylene. Recently, due to a change in an ethylene preparation route, the yield of butadiene is decreased and its price is significantly increased. In contrast, the price of ethylene is reduced. Therefore, the use of ethylene as a raw material for preparing rubber for tires is quite attractive, which can greatly save the cost of raw material.

However, copolymerization is difficult due to different polymerization mechanisms of conjugated dienes and alpha-olefins. Thus, catalyzing the copolymerization of ethylene and conjugated dienes using a same catalytic system is a highly challenging topic, and achieving copolymerization of ethylene and conjugated dienes has always been a direction of academic and industrial efforts. The existing methods for copolymerizing ethylene and conjugated dienes have the main problems that the content of a conjugated diene structural unit in the prepared polymer is not high, and the content of an unsaturated bond on a backbone of the prepared polymer is high, which makes it difficult to improve the physical properties such as weather resistance, thermal resistance and ozone resistance of the copolymer.

Therefore, it is urgent to develop a polymerization process suitable for the copolymerization of ethylene and conjugated dienes to increase the catalytic activity, the molecular weight of a polymer and the content of the conjugated diene structural unit in the polymer.

SUMMARY OF THE INVENTION

The present disclosure aims to provide an ethylene copolymer comprising a conjugated diene structural unit derived from a conjugated diene, the ethylene copolymer not only has a higher content of conjugated diene structural unit, but also has a higher content of 1,2-polymerized vinyl structural unit formed by 1,2-polymerization of the conjugated diene and having side chain double bonds, while having a low content of unsaturated bonds on a backbone of the copolymer.

According to a first aspect of the present disclosure, the present disclosure provides an ethylene copolymer, wherein the ethylene copolymer comprises an ethylene structural unit derived from ethylene and a conjugated diene structural unit derived from a conjugated diene; based on the total amount of the ethylene copolymer, the content of the conjugated diene structural unit is 25-45 mol %, and the content of a 1,2-polymerized vinyl structural unit formed by 1,2-polymerization of the conjugated diene and having side chain double bonds is 20-40 mol %; the total amount of a 1,2-polymerized structural unit is 95 mol % or more based on the total amount of the conjugated diene structural unit in the ethylene copolymer, and the ethylene copolymer has a weight average molecular weight of 20,000 to 300,000.

According to a second aspect of the present disclosure, the present disclosure provides a method for the preparation of an ethylene copolymer, comprising contacting ethylene with a conjugated diene in the presence of a polymerization catalyst, wherein the polymerization catalyst comprises a component A and a component B, the component A is selected from metal compounds represented by a formula 1, (Formula 1)

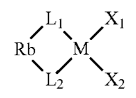

in the formula 1, M is a metal atom selected from a Group IVB, $X_1$ and $X_2$ are the same or different, and are each independently a halogen atom, Rb is a Group IVA element-containing divalent group, $L_1$ and $L_2$ are the same or different, and are each independently selected from groups represented by formulae 3 to 6, Formula 3

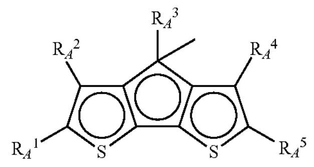

Formula 4

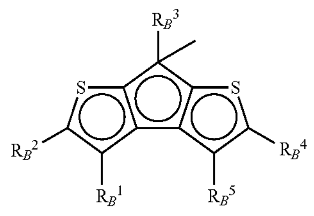

-continued

Formula 5

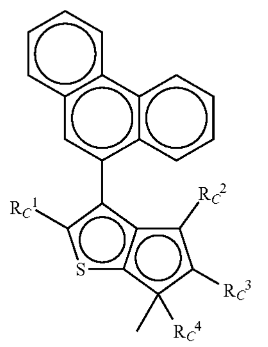

Formula 6

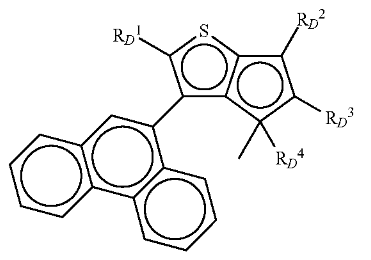

in the formula 3, $R_A^1$, $R_A^2$, $R_A^3$, $R_A^4$ and $R_A^5$ are the same or different, and are each independently a hydrogen atom or $C_1$-$C_{20}$ alkyl, in the formula 4, $R_B^1$, $R_B^2$, $R_B^3$, $R_B^4$ and $R_B^5$ are the same or different, and are each independently a hydrogen atom or $C_1$-$C_{20}$ alkyl, in the formula 5, $R_C^1$, $R_C^2$, $R_C^3$ and $R_C^4$ are the same or different, and are each independently a hydrogen atom or $C_1$-$C_{20}$ alkyl, and in the formula 6, $R_D^1$, $R_D^2$, $R_D^3$ and $R_D^4$ are the same or different, and are each independently a hydrogen atom or $C_1$-$C_{20}$ alkyl; and the component B is an aluminoxane.

According to a third aspect of the present disclosure, the present disclosure provides an ethylene copolymer prepared by the method in the second aspect of the present disclosure.

According to a fourth aspect of the present disclosure, the present disclosure provides a composition, comprising an ethylene copolymer and a crosslinking agent, wherein the ethylene copolymer is the ethylene copolymer according to the first or third aspect of the present disclosure.

According to a fifth aspect of the present disclosure, the present disclosure provides a crosslinked polymer, comprising a unit derived from the ethylene copolymer according to the first or third aspect of the present disclosure.

According to a sixth aspect of the present disclosure, the present disclosure provides a tire having at least one constituent element comprising the ethylene copolymer according to the first or third aspect of the present disclosure, the composition according to the fourth aspect of the present disclosure, or the crosslinked polymer according to the fifth aspect of the present disclosure.

The ethylene copolymer according to the present disclosure not only have a higher content of conjugated diene structural unit, but also has a higher content of 1,2-polymerized vinyl structural unit while having a low content of unsaturated double bonds on the backbone of the copolymer. The ethylene copolymer according to the present disclosure has good crosslinking properties, and a crosslinked product has good weather resistance, thermal resistance and ozone resistance. The ethylene copolymer according to the present disclosure has broad application prospects in the field of rubber, especially in the field of vehicle tire rubber.

The method for the preparation of the ethylene copolymer according to the present disclosure not only enables the preparation of the ethylene copolymer according to the present disclosure, but also achieves an improved catalytic activity, thereby improving the production efficiency, and is suitable for industrial scale applications.

DETAILED DESCRIPTION OF THE EMBODIMENTS

The endpoints and any values of the ranges disclosed herein are not limited to the precise range or value, and these ranges or values should be understood as including values close to these ranges or values. For numerical ranges, the endpoint values of each range, the endpoint values of each range and individual point values, and individual point values may be combined with each other to obtain one or more new numerical ranges, and these numerical ranges should be considered to be specifically disclosed herein.

According to a first aspect of the present disclosure, the present disclosure provides an ethylene copolymer, wherein the ethylene copolymer comprises an ethylene structural unit derived from ethylene and a conjugated diene structural unit derived from a conjugated diene.

In the present disclosure, the term of "structural unit derived from ethylene" means that the structural unit is formed from ethylene, and the structural unit has the same type of atoms and the same number of respective atoms except for a change in electronic structure compared with ethylene; and the term of "structural unit derived from a conjugated diene" means that the structural unit is formed from the conjugated diene, and the structural unit has the same type of atoms and the same number of respective atoms except for a change in electronic structure compared with the conjugated diene.

The ethylene copolymer according to the present disclosure, the conjugated diene means a compound containing a conjugated double bond in a molecular structure. The conjugated diene may be one or two or more selected from compounds represented by a formula 11, (Formula 11}

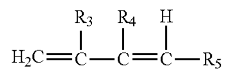

in the formula 11, $R_3$, $R_4$ and $R_5$ are the same or different, and are each selected from the group consisting of hydrogen and $C_1$-$C_5$ linear or branched alkyl.

The ethylene copolymer according to the present disclosure, specific examples of the conjugated diene may include, but are not limited to, butadiene and/or isoprene. Preferably, the conjugated diene is butadiene.

The ethylene copolymer according to the present disclosure, the content of the conjugated diene structural unit is 25-45 mol %, for example, 25, 26, 27, 28, 29, 30, 31, 32, 33, 34, 35, 36, 37, 38, 39, 40, 41, 42, 43, 44 or 45 mol % based on the total amount of the ethylene copolymer. Preferably, the content of the conjugated diene structural unit is 25-40 mol % based on the total amount of the ethylene copolymer. More preferably, the content of the conjugated diene structural unit is 30-35 mol % based on the total amount of the ethylene copolymer.

The ethylene copolymer according to the present disclosure, the conjugated diene structural unit is essentially a 1,2-polymerized structural unit formed by 1,2-polymerization of the conjugated diene, and thus the ethylene copolymer according to the present disclosure, the content of the 1,2-polymerized structural unit is high, and the content of unsaturated double bonds on a backbone of the copolymer is low. The ethylene copolymer according to the present disclosure, the total amount of the 1,2-polymerized structural unit is 95 mol % or more, preferably 98 mol % or more, more preferably 100 mol % based on the total amount of the conjugated diene structural unit in the ethylene copolymer. The ethylene copolymer according to the present disclosure, the content of double bonds on a backbone of the ethylene copolymer is generally 5 mol % or less, preferably 2 mol % or less, more preferably 0 mol %. The double bonds on the backbone of the ethylene copolymer may be derived, for example, from structural units formed by 1,4-polymerization and 1,3-polymerization of conjugated dienes.

In the present disclosure, a 1,2-polymerized structural unit refers to a structural unit formed by 1,2-polymerization (i.e., 1,2-addition) of conjugated dienes, a 1,4-polymerized structural unit refers to a structural unit formed by 1,4-polymerization (i.e., 1,4-addition) of conjugated dienes, and a 1,3-polymerized structural unit refers to a structural unit formed by 1,3-polymerization (i.e., 1,3-addition) of conjugated dienes.

The ethylene copolymer according to the present disclosure, the 1,2-polymerized structural unit includes a 1,2-polymerized vinyl structural unit formed by 1,2-polymerization of the conjugated diene and having side chain double bonds, a 1,2-cyclopropane ring structural unit formed by 1,2-polymerization of the conjugated diene and having a cyclopropane ring, and a 1,2-cyclopentane ring structural unit formed by 1,2-polymerization of the conjugated diene and having a cyclopentane ring.

Taking butadiene as an example, the 1,2-polymerized vinyl structural unit is represented by formula 14, the 1,2-cyclopropane ring structural unit is represented by formula 15, and the 1,2-cyclopentane ring structural unit is represented by formula 16:

Formula 14

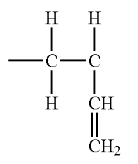

Formula 15

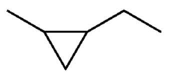

Formula 16

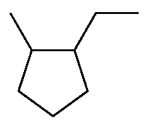

The ethylene copolymer according to the present disclosure, the content of the 1,2-polymerized vinyl structural unit formed by 1,2-polymerization of the conjugated diene and having side chain double bonds is high. The content of the 1,2-polymerized vinyl structural unit (i.e. the vinyl content) is 20-40 mol %, for example, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5 or 40 mol % based on the total amount of the ethylene copolymer according to the present disclosure. Preferably, the content of the 1,2-polymerized vinyl structural unit is 20-35 mol % based on the total amount of the ethylene copolymer according to the present disclosure. More preferably, the content of the 1,2-polymerized vinyl structural unit is 21-30 mol % based on the total amount of the ethylene copolymer according to the present disclosure.

The ethylene copolymer according to the present disclosure, the content of the 1,2-polymerized vinyl structural unit may be up to 55% or more, preferably 55-90%, for example, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90% based on the total amount of the conjugated diene structural unit in the ethylene copolymer. Preferably, the content of the 1,2-polymerized vinyl structural unit is 60-88% based on the total amount of the conjugated diene structural unit in the ethylene copolymer. More preferably, the content of the 1,2-polymerized vinyl structural unit is 63-85% based on the total amount of the conjugated diene structural unit in the ethylene copolymer.

The ethylene copolymer according to the present disclosure, in the conjugated diene structural unit of the copolymer, a molar ratio of the 1,2-cyclopentane ring structural unit to the 1,2-cyclopropane ring structural unit is 0.1-3:1, preferably 0.3-2.5:1, more preferably 0.4-2:1, further preferably 0.5-1.8:1. In the present disclosure, the microstructure composition of the ethylene copolymer is determined by nuclear magnetic resonance spectroscopy.

The ethylene copolymer according to the present disclosure not only has a higher content of 1,2-polymerized vinyl structural unit, but also has a higher molecular weight. The ethylene copolymer according to the present disclosure has a weight average molecular weight ($M_w$) of 20,000 to 300,000, preferably 25,000 to 250,000, more preferably 30,000 to 200,000, further preferably 40,000 to 150,000. The ethylene copolymer according to the present disclosure, the ethylene copolymer has a molecular weight distribution index ($M_w/M_n$) of 3.5 or less, preferably 3.2 or less, more preferably 1.5-3.

In the present disclosure, the molecular weight (g/mol) and the molecular weight distribution index are determined by gel permeation chromatography (GPC) with monodisperse polystyrene as a standard. The ethylene copolymer according to the present disclosure, the glass transition temperature ($T_g$) of the ethylene copolymer may be in the range of −50° C. to −15° C., preferably in the range of −40° C. to −20° C.

In the present disclosure, the glass transition temperature is determined by differential scanning calorimetry (DSC).

According to a second aspect of the present disclosure, the present disclosure provides a method for the preparation of an ethylene copolymer, comprising contacting ethylene with a conjugated diene in the presence of a polymerization catalyst.

According to the preparation method of the present disclosure, the conjugated diene means a compound containing a conjugated double bond in a molecular structure. The conjugated diene may be one or two or more selected from compounds represented by a formula 11, (Formula 11}

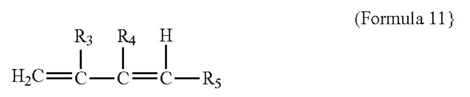

in the formula 11, $R_3$, $R_4$ and $R_5$ are the same or different, and are each selected from the group consisting of hydrogen and $C_1$-$C_5$ linear or branched alkyl.

According to the preparation method of the present disclosure, specific examples of the conjugated diene may include, but are not limited to, butadiene and/or isoprene. Preferably, the conjugated diene is butadiene.

According to the preparation method of the present disclosure, the polymerization catalyst includes a component A and a component B.

The component A is selected from metal compounds represented by formula 1, (Formula 1)

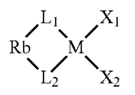

in the formula 1, M is a metal atom selected from a Group IVB, and may be a titanium atom, a zirconium atom or a hafnium atom. Preferably, in the formula 1, M is a zirconium atom.

In the formula 1, $X_1$ and $X_2$ are the same or different, and are each independently a halogen atom. Preferably, in the formula 1, $X_1$ and $X_2$ are both chlorine atoms.

In the formula 1, Rb is a Group IVA element-containing divalent group. In the formula 1, Rb is preferably a divalent group containing silicon, more preferably a divalent group represented by a formula 2, (Formula 2)

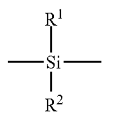

in the formula 2, $R^1$ and $R^2$ are the same or different, and are each independently $C_1$-$C_{10}$ alkyl. The $C_1$-$C_{10}$ alkyl includes $C_1$-$C_{10}$ linear alkyl, $C_3$-$C_{10}$ branched alkyl, and $C_3$-$C_{10}$ cycloalkyl, and specific examples of the $C_1$-$C_{10}$ alkyl may include, but are not limited to methyl, ethyl, n-propyl, isopropyl, n-butyl, sec-butyl, isobutyl, tert-butyl, pentyl and its various isomers, hexyl and its various isomers, heptyl and its various isomers, octyl and its various isomers, nonyl and its various isomers, decyl and its various isomers, cyclopropyl, cyclobutyl, cyclopentyl or cyclohexyl.

Preferably, in the formula 2, $R^1$ and $R^2$ are both methyl.

In the formula 1, $L_1$ and $L_2$ are the same or different, and are each independently selected from groups represented by formulae 3 to 6, Formula 3

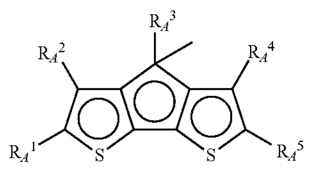

-continued

Formula 4

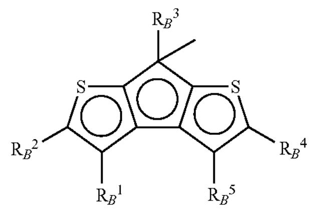

Formula 5

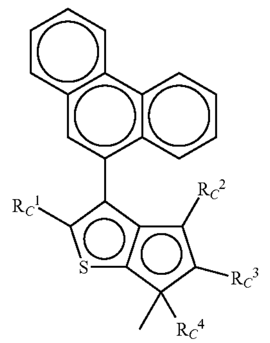

Formula 6

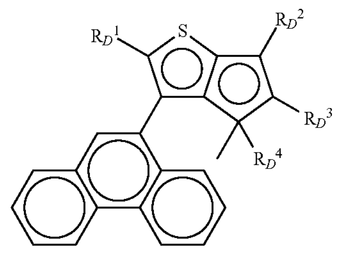

in the formula 3, $R_A^1$, $R_A^2$, $R_A^3$, $R_A^4$ and $R_A^5$ are the same or different, and are each independently a hydrogen atom or $C_1$-$C_{20}$ alkyl.

In the present disclosure, the $C_1$-$C_{20}$ alkyl includes $C_1$-$C_{20}$ linear alkyl, $C_3$-$C_{20}$ branched alkyl and $C_3$-$C_{20}$ cycloalkyl, and specific examples of the $C_1$-$C_{20}$ alkyl may include, but are not limited to methyl, ethyl, n-propyl, isopropyl, n-butyl, sec-butyl, isobutyl, tert-butyl, pentyl and its various isomers, hexyl and its various isomers, heptyl and its various isomers, octyl and its various isomers, nonyl and its various isomers, decyl and its various isomers, undecyl and its various isomers, dodecyl and its various isomers, tridecyl and its various isomers, tetradecyl and its various isomers, pentadecyl and its various isomers, hexadecyl and its various isomers, heptadecyl and its various isomers, octadecyl and its various isomers, nonadecyl and its various isomers, eicosyl and its various isomers, cyclopropyl, cyclobutyl, cyclopentyl and cyclohexyl.

In one embodiment, in the formula 3, $R_A^1$, $R_A^2$, $R_A^3$, $R_A^4$ and $R_A^5$ are simultaneously hydrogen atoms. In another embodiment, in the formula 3, $R_A^1$, $R_A^2$, $R_A^3$, $R_A^4$ and $R_A^5$ are each independently a hydrogen atom or $C_1$-$C_{20}$ alkyl, and $R_A^1$, $R_A^2$, $R_A^3$, $R_A^4$ and $R_A^5$ are not simultaneously a hydrogen atom. In this embodiment, at least one (preferably two) of $R_A^1$, $R_A^2$, $R_A^3$, $R_A^4$ and $R_A^5$ is preferably $C_1$-$C_{10}$ alkyl, more preferably $C_1$-$C_6$ alkyl, further preferably $C_1$-$C_3$ alkyl, more preferably methyl, and the remaining groups are hydrogen atoms.

In the formula 4, $R_B^1$, $R_B^2$, $R_B^3$, $R_B^4$ and $R_B^5$ are the same or different, and are each independently a hydrogen atom or $C_1$-$C_{20}$ alkyl.

In one embodiment, in the formula 4, $R_B^1$, $R_B^2$, $R_B^3$, $R_B^4$ and $R_B^5$ are simultaneously hydrogen atoms. In another embodiment, in the formula 4, $R_B^1$, $R_B^2$, $R_B^3$, $R_B^4$ and $R_B^5$ are each independently a hydrogen atom or $C_1$-$C_{20}$ alkyl, and $R_B^1$, $R_B^2$, $R_B^3$, $R_B^4$ and $R_B^5$ are not simultaneously a hydrogen atom, and in this embodiment, at least one (preferably two, more preferably $R_B^2$ and $R_B^4$) of $R_B^1$, $R_B^2$, $R_B^3$, $R_B^4$ and $R_B^5$ is preferably $C_1$-$C_{10}$ alkyl, more preferably $C_1$-$C_6$ alkyl, further preferably $C_1$-$C_3$ alkyl, even preferably methyl, and the remaining groups are hydrogen atoms.

In the formula 5, $R_C^1$, $R_C^2$, $R_C^3$ and $R_C^4$ are the same or different, and are each independently a hydrogen atom or $C_1$-$C_{20}$ alkyl.

In one preferred embodiment, in the formula 5, at least one (preferably two, more preferably $R_C^1$ and $R_C^3$) of $R_C^1$, $R_C^2$, $R_C^3$ and $R_C^4$ is $C_1$-$C_{20}$ alkyl, preferably $C_1$-$C_6$ alkyl, more preferably $C_1$-$C_3$ alkyl, further preferably methyl, ethyl, n-propyl or isopropyl, and the remaining groups are hydrogen atoms.

According to this preferred embodiment, in one more preferred example, $R_C^1$ is methyl, $R_C^3$ is ethyl or n-propyl, and $R_C^2$ and $R_C^4$ are hydrogen atoms.

In the formula 6, $R_D^1$, $R_D^2$, $R_D^3$ and $R_D^4$ are the same or different, and are each independently a hydrogen atom or $C_1$-$C_{20}$ alkyl.

In one preferred embodiment, in the formula 6, at least one (preferably two, more preferably $R_D^1$ and $R_D^3$) of $R_D^1$, $R_D^2$, $R_D^3$ and $R_D^4$ is $C_1$-$C_{20}$ alkyl, preferably $C_1$-$C_6$ alkyl, more preferably $C_1$-$C_3$ alkyl, further preferably methyl, ethyl, n-propyl or isopropyl, and the remaining groups are hydrogen atoms.

According to this preferred embodiment, in one more preferred example, $R_D^1$ is methyl, $R_D^3$ is ethyl or n-propyl, and $R_D^2$ and $R_D^4$ are hydrogen atoms.

According to the preparation method of the present disclosure, the component A is preferably one or two or more selected from metal compounds represented by formulae 7 to 10:

Formula 7

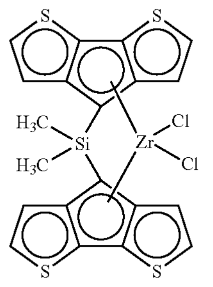

Formula 8

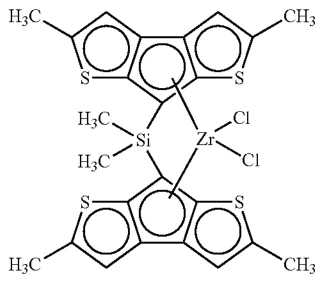

-continued

Formula 9

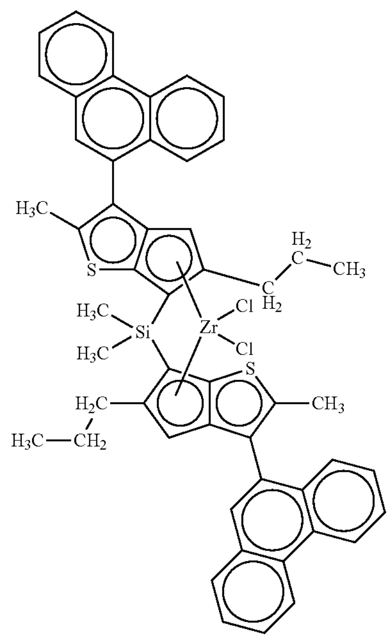

Formula 10

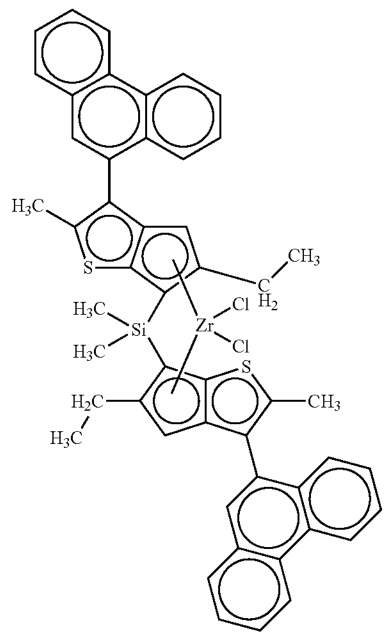

In one more preferred example, the component A is selected from metal compounds represented by the formula 7 and the formula 8. According to this more preferred example, the method according to the present disclosure not only increases the content of the conjugated diene structural unit derived from the conjugated diene and the content of a structural unit formed by 1,2-polymerization of the conjugated diene in the ethylene copolymer, but also achieves a higher catalytic activity, preparing the ethylene copolymer having a higher molecular weight.

In another more preferred example, the component A is selected from metal compounds represented by the formula 9 and the formula 10. According to this more preferred example, the method according to the present disclosure enables more conjugated dienes to be polymerized in a 1,2-polymerization manner under the condition of obtaining a higher catalytic activity, thereby obtaining the ethylene copolymer having a higher content of 1,2-polymerized structural unit.

According to the preparation method of the present disclosure, the metal compound as the component A can be obtained commercially or can be prepared by a conventional method.

According to the preparation method of the present disclosure, the component B comprises an aluminoxane, preferably an organoaluminoxane, more preferably methylaluminoxane. In one preferred embodiment, the component B is an aluminoxane, preferably an organoaluminoxane, more preferably methylaluminoxane.

According to the preparation method of the present disclosure, a molar ratio of the component A to the component B may be 1:0.1-5000, preferably 1:1-3000, more preferably 1:1-1000, further preferably 1:10-1000, even further preferably 1:100-800.

According to the preparation method of the present disclosure, the component A may be used in an amount of 0.1-100 μmol, preferably 1-80 μmol, more preferably 3-60 μmol, further preferably 5-30 μmol relative to 1 mol of the conjugated diene.

According to the preparation method of the present disclosure, contacting ethylene with the conjugated diene can be carried out at a temperature of −50° C. to 150° C., preferably 10-120° C., more preferably 30-90° C., further preferably 40-70° C. According to the preparation method of the present disclosure, when ethylene is in contact with the conjugated diene for polymerization, the pressure of ethylene may be 0-100 MPa, preferably 2-50 MPa, more preferably 3-30 MPa, further preferably 5-10 MPa, the pressure being in terms of a gauge pressure (G).

According to the preparation method of the present disclosure, the contacting is carried out in the presence of a molecular weight regulator, and the molecular weight regulator is used in an amount so that the prepared olefin polymer has a weight average molecular weight of 20,000 to 300,000, preferably 25,000 to 250,000, more preferably 30,000 to 200,000, further preferably 40,000 to 150,000. The molecular weight regulator may be conventionally selected, preferably hydrogen.

The preparation method of the present disclosure can be carried out by solution polymerization. Solvents that may be used in the solution polymerization include $C_6$-$C_{12}$ aromatic hydrocarbons, $C_6$-$C_{12}$ halogenated aromatic hydrocarbons, $C_5$-$C_{10}$ linear alkanes and $C_5$-$C_{10}$ cycloalkanes, for example, one or two or more of toluene, chlorobenzene, dichlorobenzene, n-hexane and cyclohexane. According to a third aspect of the present disclosure, the present disclosure provides an ethylene copolymer prepared by the method in the second aspect of the present disclosure.

The ethylene copolymer prepared by the method according to the second aspect of the present disclosure not only has a higher content of conjugated diene structural unit, but also has a high content of structural unit formed by 1,2-polymerization of the conjugated diene, and thus the ethylene copolymer according to the third aspect of the present disclosure has a low content of unsaturated double bonds on a molecular backbone and has good weather resistance, thermal resistance and ozone resistance. More importantly, the ethylene copolymer according to the third aspect of the present disclosure has a higher content of 1,2-polymerized vinyl structural unit, and thus the ethylene copolymer according to the third aspect of the present disclosure has more excellent vulcanization properties, showing a faster vulcanization speed and a higher degree of vulcanization.

The content of the conjugated diene structural unit is 20-45 mol %, for example, 20, 21, 22, 23, 24, 25, 26, 27, 28, 29, 30, 31, 32, 33, 34, 35, 36, 37, 38, 39, 40, 41, 42, 43, 44 or 45 mol % based on the total amount of the ethylene copolymer according to the third aspect of the present disclosure. Preferably, the content of the conjugated diene structural unit is 25-40 mol % based on the total amount of the ethylene copolymer according to the third aspect of the present disclosure. More preferably, the content of the conjugated diene structural unit is 30-35 mol % based on the total amount of the ethylene copolymer according to the third aspect of the present disclosure.

The ethylene copolymer according to the third aspect of the present disclosure, the conjugated diene structural unit is substantially a 1,2-polymerized structural unit formed by 1,2-polymerization of the conjugated diene. The total amount of the 1,2-polymerized structural unit is 95 mol % or more, preferably 98 mol % or more, more preferably 100 mol % based on the total amount of the conjugated diene structural unit in the ethylene copolymer. The ethylene copolymer according to the third aspect of the present disclosure, the content of double bonds on a backbone of the ethylene copolymer is generally 5 mol % or less, preferably 2 mol % or less, more preferably 0 mol %.

The ethylene copolymer according to the third aspect of the present disclosure, the 1,2-polymerized structural unit includes a 1,2-polymerized vinyl structural unit formed by 1,2-polymerization of the conjugated diene and having side chain double bonds, a 1,2-cyclopropane ring structural unit formed by 1,2-polymerization of the conjugated diene and having a cyclopropane ring, and a 1,2-cyclopentane ring structural unit formed by 1,2-polymerization of the conjugated diene and having a cyclopentane ring. The content of the 1,2-polymerized vinyl structural unit is 18-40 mol %, for example, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 31, 31.5, 32, 32.5, 33, 33.5, 34, 34.5, 35, 35.5, 36, 36.5, 37, 37.5, 38, 38.5, 39, 39.5 or 40 mol % based on the total amount of the ethylene copolymer according to the third aspect of the present disclosure. Preferably, the content of the 1,2-polymerized vinyl structural unit is 20-35 mol % based on the total amount of the ethylene copolymer according to the third aspect of the present disclosure. More preferably, the content of the 1,2-polymerized vinyl structural unit is 21-30 mol % based on the total amount of the ethylene copolymer according to the third aspect of the present disclosure.

The content of the 1,2-polymerized vinyl structural unit may be up to 55% or more, preferably 55-90%, for example, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90% based on the total amount of the conjugated diene structural unit in the ethylene copolymer according to the third aspect of the present disclosure. Preferably, the content of the 1,2-polymerized vinyl structural unit is 60-88% based on the total amount of the conjugated diene structural unit in the ethylene copolymer according to the third aspect of the present disclosure. More preferably, the content of the 1,2-polymerized vinyl structural unit is 63-85% based on the total amount of the conjugated diene structural unit in the ethylene copolymer according to the third aspect of the present disclosure.

The ethylene copolymer according to the third aspect of the present disclosure, in the conjugated diene structural unit of the copolymer, a molar ratio of the 1,2-cyclopentane ring structural unit to the 1,2-cyclopropane ring structural unit is 0.1-3:1, preferably 0.3-2.5:1, more preferably 0.4-2:1, further preferably 0.5-1.8:1.

The ethylene copolymer according to the third aspect of the present disclosure may have a weight average molecular weight ($M_w$) of 20,000 to 300,000, preferably 25,000 to 250,000, more preferably to 200,000, further preferably 40,000 to 150,000. The ethylene copolymer according to the third aspect of the present disclosure, the ethylene copolymer has a molecular weight distribution index ($M_w/M_n$) of 3.5 or less, preferably 3.2 or less, more preferably 1.5-3.

The ethylene copolymer according to the third aspect of the present disclosure, the glass transition temperature ($T_g$) of the ethylene copolymer may be in the range of −50° C. to −15° C., preferably in the range of −40° C. to −20° C.

According to a fourth aspect of the present disclosure, the present disclosure provides a composition, comprising an ethylene copolymer and a crosslinking agent, wherein the ethylene copolymer is the ethylene copolymer according to the first or third aspect of the present disclosure.

The crosslinking agent may be a substance sufficient to crosslink vinyl in the ethylene copolymer. In particular, the crosslinking agent may be one or two or more selected from the group consisting of sulfur, sulfur monochloride, selenium, tellurium and peroxide. In one preferred embodiment, the crosslinking agent is peroxide, such as dicumyl peroxide.

The composition according to the present disclosure may also comprise a vulcanization accelerator to accelerate vulcanization, thereby shortening the vulcanization time, lowering the vulcanization temperature and reducing the amount of a vulcanizing agent used. The vulcanization accelerator may be a conventional substance capable of fulfilling the above function, for example triallyl isocyanurate. The composition according to the present disclosure may also comprise other components according to specific requirements, such as one or two or more of antioxidant and filler, and a preferred example of the filler may include, but is not limited to, carbon black.

According to a fifth aspect of the present disclosure, the present disclosure provides a crosslinked polymer formed by crosslinking the ethylene copolymer according to the first aspect of the present disclosure or the third aspect of the present disclosure. The ethylene copolymer according to the first or third aspect of the present disclosure may be in contact with a crosslinking agent for a crosslinking reaction to obtain the crosslinked polymer according to the fifth aspect of the present disclosure.

According to a sixth aspect of the present disclosure, the present disclosure provides a tire having at least one constituent element comprising the ethylene copolymer according to the first aspect of the present disclosure, the composition according to the fourth aspect of the present disclosure, or the crosslinked polymer according to the fifth aspect of the present disclosure.

The present disclosure is described in detail below with reference to examples, but the scope of the present disclosure is not thereby limited.

In the following examples and comparative examples, the molecular weight and molecular weight distribution index ($M_w/M_n$) of a polymer were determined by using a 1260 Infinity II high temperature gel permeation chromatograph manufactured by Agilent Corporation using two MIXD-B chromatographic columns (300×7.5 mm) and one Guard chromatographic column (50×7.5 mm). A mobile phase was trichlorobenzene, and a flow rate was 1 mL/min; a sample solution has a concentration of 1 mg/mL, and an injection volume was 200 μL; the test temperature was 150° C.; and monodisperse polystyrene was used as a standard sample.

In the following examples and comparative examples, NMR spectroscopy was carried out by using a 400 MHz NMR spectrometer commercially available from Bruker Corporation, and deuterated o-dichlorobenzene was used as a solvent, and tetramethylsilicon (TMS) was used as an internal standard when the microstructure of a polymer was tested. Wherein the term of "conjugated diene structural unit" refers to a structural unit formed from a conjugated diene, the term of "1,2-polymerization" refers to polymerization of conjugated dienes in a 1,2-addition manner, the term of "1,4-polymerization" refers to polymerization of conjugated dienes in a 1,4-addition manner, and the term of "1,3-polymerization" refers to polymerization of conjugated dienes in a 1,3-addition manner; and the term of "vinyl" refers to a structural unit formed by 1,2-polymerization of conjugated dienes and having side chain double bonds (taking butadiene as example, vinyl is

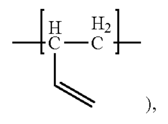

), the term of "cyclopropane ring" refers to a structural unit formed by 1,2-polymerization of conjugated dienes and having a cyclopropane ring taking butadiene as example, the cyclopropane ring is

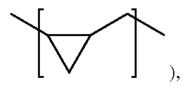

), and the term of "cyclopentane ring" refers to a structural unit formed by 1,2-polymerization of of conjugated dienes and having a cyclopentane ring (taking butadiene as example, the cyclopentane ring is

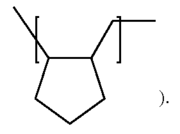

).

The following examples and comparative examples refer to the following metal compounds and comparative metal compounds.

Metal compound 1

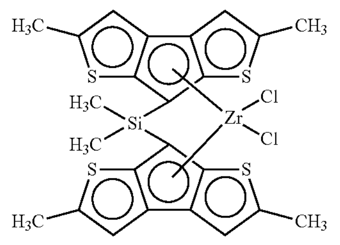

-continued
Metal compound 4
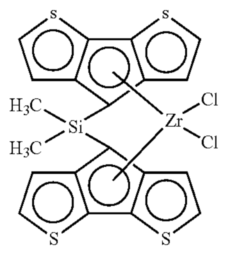
Metal compound 2
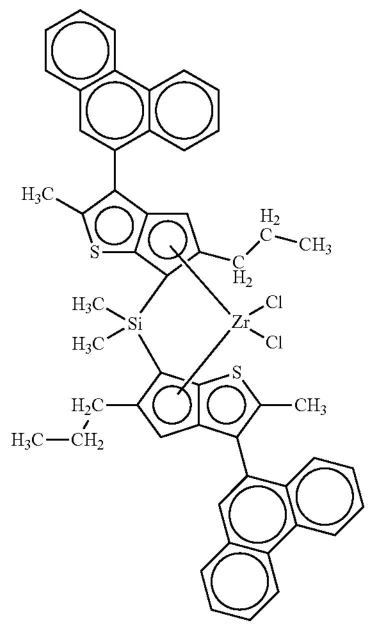
Metal compound 3
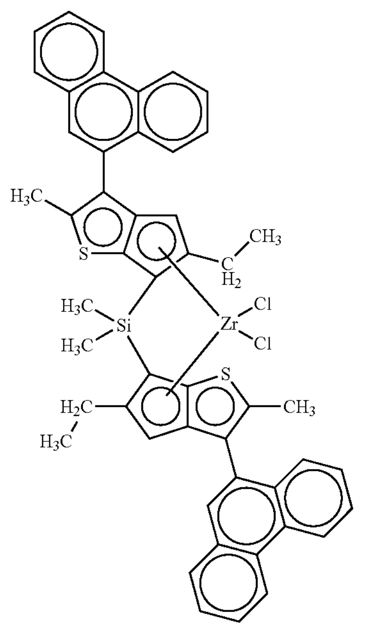
-continued
Comparative metal compound 1
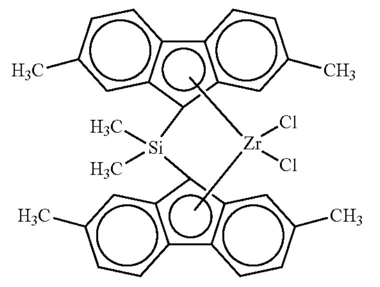
Comparative metal compound 4
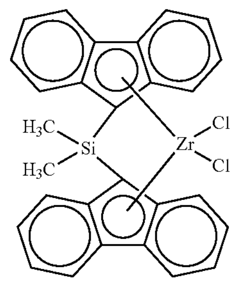
Comparative metal compound 2
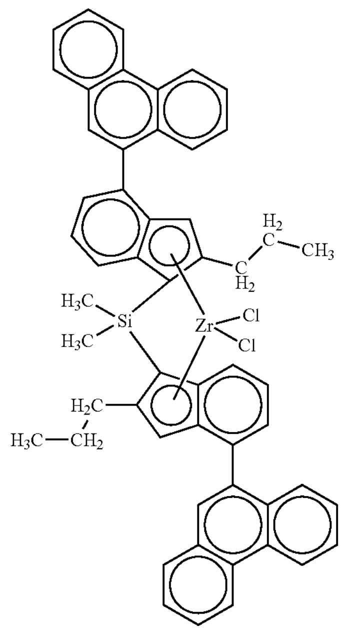

-continued

Comparative metal compound 3

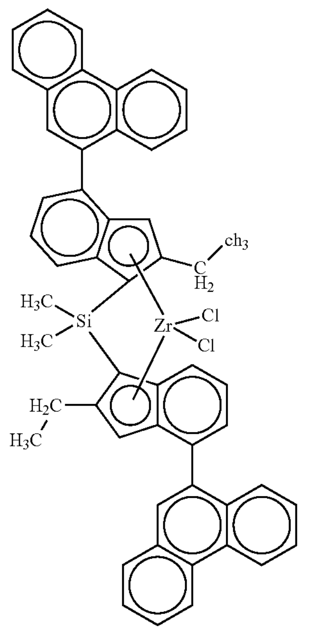

Comparative metal compound 5

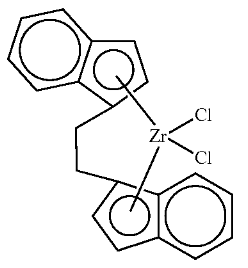

Comparative metal compound 6

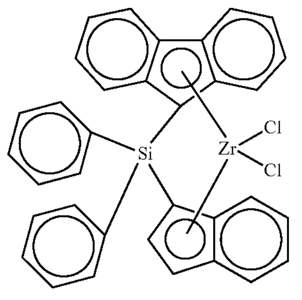

Preparative examples 1-4 were used to prepare metal compounds 1-4.

Preparative Example 1

Synthesis of Metal Compound 1

0.94 g (2 mmol) of bis(2,5-dimethylcyclopentadithiophene)-dimethylsilicon and 50 mL of diethyl ether were added into a reaction flask, and 2.5 mL (4 mmol) of a 1.6 M solution of butyllithium in hexane was added dropwise at −78° C. After stirring at room temperature (25° C.) for 6 hours, the temperature was reduced to −40° C., and 0.466 g (2 mmol) of zirconium tetrachloride was added slowly. Stirring was performed overnight. Filtering was performed, and the resulting solid was washed with diethyl ether. A product was recrystallized with dichloromethane. Yield: 45 wt %.

$H^1$-NMR ($CDCl_3$, 400 MHz): δ ppm 6.75 (q, 4H), 2.51 (d, 12H), 1.82 (s, 6H).

Preparative Example 2

Synthesis of Metal Compound 4

The same synthesis method as that of the metal compound 1 was employed except that bis(2,5-dimethylcyclopentadithiophene)-dimethylsilicon was replaced with 2 mmol of bis(cyclopentadithiophene)-dimethylsilicon. Yield: 57 wt %.

$H^1$-NMR ($CDCl_3$, 400 MHz): δ ppm 7.15 (d, 4H), 7.10 (d, 4H), 1.80 (s, 6H).

Preparative Example 3

Synthesis of Metal Compound 2.

1.02 g (2 mmol) of bis(2-methyl-5-n-propyl-3-(9-phenanthryl)-6-hydro-cyclopenta[2,3-b]thiophene-6)-dimethylsilicon and 50 mL of diethyl ether were added into a reaction flask, and 2.5 mL (4 mmol) of a 1.6 M solution of butyllithium in hexane was added dropwise at −78° C. After stirring at room temperature (25° C.) for 6 hours, 0.466 g (2 mmol) of zirconium tetrachloride was added slowly. Stirring was performed overnight. Filtering was performed, and the resulting solid was washed with diethyl ether. A filtrate was drained to give a target product. Yield: 56 wt %.

$H^1$-NMR ($CDCl_3$, 400 MHz): δ ppm 7.15-8.90 (m, 18H), 6.62 (s, 2H), 1.15-2.95 (m, 14H), 1.08 (s, 6H), (t, 6H).

Preparative Example 4

Synthesis of Metal Compound 3

The same synthesis method as that of a metal compound 5 was adopted except that 2 mmol of bis(2-methyl-5-ethyl-3-(9-phenanthryl)-6-hydro-cyclopenta[2,3-b]thiophene-6)-dimethylsilicon was used instead of bis(2,5-dimethyl-3-phenyl-6-hydro-cyclopenta[2,3-b]thiophene-6)-dimethylsilicon. Yield: 61 wt %.

$H^1$-NMR ($CDCl_3$, 400 MHz): δ ppm 7.10-8.85 (m, 18H), 6.60 (s, 2H), 1.85-2.80 (m, 10H), 1.10 (s, 6H), (s, 6H).

Examples 1-6 served to illustrate the ethylene polymer and the preparation method thereof according to the present disclosure.

Example 1

A 500 mL stainless steel reactor was subjected to full replacement with nitrogen, and was then subjected to full replacement with hydrogen, 120 g of toluene, 8 mL of methylaluminoxane (a 10 wt % solution in toluene), and 25.0 g of butadiene were added, and 0.44 $kg/cm^2G$ of hydrogen was then added. A liquid phase and a gas phase were saturated with 7.8 $kg/cm^2G$ of ethylene at 60° C. Then 5 μmol of a metal compound 1 previously dissolved in toluene was added to start polymerization. Ethylene gas was continuously supplied to maintain a total pressure to be 7.8 $kg/cm^2G$. After 15 minutes of polymerization, a small amount of methanol was added to terminate the reaction. The resulting product was poured into a large amount of ethanol to which hydrochloric acid (the HCl concentration was 0.2 wt %) was added for precipitation, a solid was separated by filtration, and the separated solid was washed with ethanol. The washed solid was dried with a vacuum oven until the weight was no longer reduced to obtain the ethylene copolymer according to the present disclosure. The specific experimental conditions are listed in Table 1, and the test results of the property parameters of the prepared ethylene copolymer are listed in Table 2.

Comparative Example 1

An ethylene copolymer was prepared by the same method as that in Example 1 except that instead of using methylaluminoxane, 2.5 mL of an n-hexane solution of triisobutylaluminum (the concentration of triisobutylaluminum was 1 M) was used, and 0.03 mmol of trityl-tetrakis(pentafluorophenyl)borate was dissolved in toluene together with the metal compound 1 to be added to a polymerization reactor. The specific experimental conditions are listed in Table 1, and the test results of the property parameters of the prepared ethylene copolymer are listed in Table 2.

Comparative Example 2

An ethylene copolymer was prepared by the same method as that in Comparative Example 1 except that the metal compound 1 was replaced with a comparative metal compound 1. The specific experimental conditions are listed in Table 1, and the test results of the property parameters of the prepared ethylene copolymer are listed in Table 2.

Comparative Example 3

An ethylene copolymer was prepared by the same method as that in Example 1 except that the metal compound 1 was replaced with the comparative metal compound 1. The specific experimental conditions are listed in Table 1, and the test results of the property parameters of the prepared ethylene copolymer are listed in Table 2.

Example 2

An ethylene copolymer was prepared by the same method as that in Example 1 except that the metal compound 1 was replaced with a metal compound 2, and the property parameters of the prepared ethylene copolymer are listed in Table 2.

Comparative Example 4

An ethylene copolymer was prepared by the same method as that in Example 2 except that instead of using methylaluminoxane, 2.5 mL of an n-hexane solution of triisobutylaluminum (the concentration of triisobutylaluminum was 1 M) was used, and 0.03 mmol of trityl-tetrakis(pentafluorophenyl)borate was dissolved in toluene together with the metal compound 2 to be added to the polymerization reactor. The specific experimental conditions are listed in Table 1, and the test results of the property parameters of the prepared ethylene copolymer are listed in Table 2.

Comparative Example 5

An ethylene copolymer was prepared by the same method as that in Example 2 except that the metal compound 2 was replaced with a comparative metal compound 2. The specific experimental conditions are listed in Table 1, and the test results of the property parameters of the prepared ethylene copolymer are listed in Table 2.

Example 3

A 500 mL stainless steel reactor was subjected to full replacement with nitrogen, and was then subjected to full replacement with hydrogen, 120 g of toluene, 7.5 mL of MAO (a 10 wt % solution in toluene), and 35 g of butadiene were added, 0.44 kg/cm$^2$G of hydrogen was then added, and a liquid phase and a gas phase were saturated with 7.8 kg/cm$^2$G of ethylene at 60° C. Then 5 μmol of the metal compound 2 previously dissolved in toluene was added to start polymerization. Ethylene gas was continuously supplied to maintain a total pressure to be 7.8 kg/cm$^2$G. After 15 minutes of polymerization, a small amount of methanol was added to terminate the reaction. The resulting product was poured into a large amount of ethanol to which hydrochloric acid (0.2 wt %, hydrochloric acid being in terms of HCl) was added, and precipitated, and a copolymer was separated by filtration, and washed with ethanol. The washed copolymer was dried with a vacuum oven until the weight was no longer reduced to obtain the ethylene copolymer according to the present disclosure. The specific experimental conditions are listed in Table 1, and the test results of the property parameters of the prepared ethylene copolymer are listed in Table 2.

Comparative Example 6

An ethylene copolymer was prepared by the same method as that in Example 3 except that the metal compound 2 was replaced with the comparative metal compound 2. The specific experimental conditions are listed in Table 1, and the test results of the property parameters of the prepared ethylene copolymer are listed in Table 2.

Example 4

An ethylene copolymer was prepared by the same method as that in Example 1 except that the metal compound 1 was replaced with a metal compound 3. The specific experimental conditions are listed in Table 1, and the test results of the property parameters of the prepared ethylene copolymer are listed in Table 2.

Comparative Example 7

An ethylene copolymer was prepared by the same method as that in Example 3 except that instead of using methylaluminoxane, 2.5 mL of an n-hexane solution of triisobutylaluminum (the concentration of triisobutylaluminum was 1 M) was used, and 0.03 mmol of trityl-tetrakis(pentafluorophenyl)borate was dissolved in toluene together with the metal compound 3 to be added to the polymerization reactor. The specific experimental conditions are listed in Table 1, and the test results of the property parameters of the prepared ethylene copolymer are listed in Table 2.

Comparative Example 8

An ethylene copolymer was prepared by the same method as that in Example 3 except that the metal compound 3 was replaced with a comparative metal compound 3. The specific experimental conditions are listed in Table 1, and the test results of the property parameters of the prepared ethylene copolymer are listed in Table 2.

Comparative Example 9

An ethylene copolymer was prepared by the same method as that in Example 3 except that the metal compound 3 was replaced with a comparative metal compound 3. The specific experimental conditions are listed in Table 1, and the test results of the property parameters of the prepared ethylene copolymer are listed in Table 2.

Example 5

An ethylene copolymer was prepared by the same method as that in Example 1 except that the metal compound 1 was replaced with a metal compound 4. The specific experimental conditions are listed in Table 1, and the test results of the property parameters of the prepared ethylene copolymer are listed in Table 2.

Comparative Example 10

An ethylene copolymer was prepared by the same method as that in Example 5 except that instead of using methylaluminoxane, 2.5 mL of an n-hexane solution of triisobutylaluminum (the concentration of triisobutylaluminum was 1 M) was used, and 0.03 mmol of trityl-tetrakis(pentafluorophenyl)borate was dissolved in toluene together with the metal compound 4 to be added to the polymerization reactor. The specific experimental conditions are listed in Table 1, and the test results of the property parameters of the prepared ethylene copolymer are listed in Table 2.

Comparative Example 11

An ethylene copolymer was prepared by the same method as that in Example 5 except that the metal compound 4 was replaced with a comparative metal compound 4. The specific experimental conditions are listed in Table 1, and the test results of the property parameters of the prepared ethylene copolymer are listed in Table 2.

Example 6

An ethylene copolymer was prepared by the same method as that in Example 1 except that the metal compound 1 was replaced with the metal compound 4. The specific experimental conditions are listed in Table 1, and the test results of the property parameters of the prepared ethylene copolymer are listed in Table 2.

Comparative Example 12

An ethylene copolymer was prepared by the same method as that in Example 6 except that the metal compound 4 was replaced with a comparative metal compound 5. The specific experimental conditions are listed in Table 1, and the test results of the property parameters of the prepared ethylene copolymer are listed in Table 2.

Comparative Example 13

An ethylene copolymer was prepared by the same method as that in Example 6 except that the metal compound 4 was replaced with a comparative metal compound 6. The specific experimental conditions are listed in Table 1, and the test results of the property parameters of the prepared ethylene copolymer are listed in Table 2.

TABLE 1

| | Metal compound | | | | Trityl-tetra | | | |
|---|---|---|---|---|---|---|---|---|
| No. | No. | Usage amount μmol | MAO mL | Triisobutyl-aluminum mL | kis(pentafluoro-phenyl)borate mmol | Butadiene g | Ethylene $kg/cm^2$ G | Hydrogen $kg/cm^2$ G |
| Example 1 | 1 | 5 | 8 | — | — | 25.0 | 7.8 | 0.44 |
| Comparative Example 1 | 1 | 5 | — | 2.5 | 0.03 | 25.0 | 7.8 | 0.44 |
| Comparative Example 2 | Comparative metal compound 1 | 5 | — | 2.5 | 0.03 | 25.0 | 7.8 | 0.44 |
| Comparative Example 3 | Comparative metal compound 1 | 5 | 8 | — | — | 25.0 | 7.8 | 0.44 |
| Example 2 | 2 | 5 | 8 | — | — | 25.0 | 7.8 | 0.44 |
| Comparative Example 4 | 2 | 5 | | 2.5 | 0.03 | 25.0 | 7.8 | 0.44 |
| Comparative Example 5 | Comparative metal compound 2 | 5 | 8 | — | — | 25.0 | 7.8 | 0.44 |
| Example 3 | 2 | 5 | 7.5 | — | — | 35.0 | 7.8 | 0.44 |
| Comparative Example 6 | Comparative metal compound 2 | 5 | 7.5 | — | — | 35.0 | 7.8 | 0.44 |
| Example 4 | 3 | 5 | 8 | — | — | 25.0 | 7.8 | 0.44 |
| Comparative Example 7 | 3 | 5 | — | 2.5 | 0.03 | 25.0 | 7.8 | 0.44 |
| Comparative Example 8 | Comparative metal compound 3 | 5 | — | 2.5 | 0.03 | 25.0 | 7.8 | 0.44 |
| Comparative Example 9 | Comparative metal compound 3 | 5 | 8 | — | — | 25.0 | 7.8 | 0.44 |
| Example 5 | 4 | 5 | 8 | — | — | 25.0 | 7.8 | 0.44 |
| Comparative Example 10 | 4 | 5 | — | 2.5 | 0.03 | 25.0 | 7.8 | 0.44 |
| Comparative Example 11 | Comparative metal compound 4 | 5 | 8 | — | — | 25.0 | 7.8 | 0.44 |

TABLE 1-continued

| No. | Metal compound No. | Metal compound Usage amount µmol | MAO mL | Triisobutyl-aluminum mL | Trityl-tetrakis(pentafluoro-phenyl)borate mmol | Butadiene g | Ethylene $kg/cm^2$ G | Hydrogen $kg/cm^2$ G |
|---|---|---|---|---|---|---|---|---|
| Example 6 | 4 | 5 | 8 | — | — | 25.0 | 12 | 0.44 |
| Comparative Example 12 | Comparative metal compound 5 | 5 | 8 | — | — | 25.0 | 7.8 | 0.44 |
| Comparative Example 13 | Comparative metal compound 6 | 5 | 8 | — | — | 25.0 | 7.8 | 0.44 |

TABLE 2

| No. | Yield g | Activity kg/(mmol · h) | $M_w$ | $M_n$ | $M_w/M_n$ | Melting point ° C. | Glass transition temperature ° C. | Content of conjugated diene structural unit mol % | Vinyl content mol % | Cyclo-propane ring content mol % | Cyclo-pentane ring content mol % | Content of 1,4-structure mol % | Content of 1,3-structure mol % |
|---|---|---|---|---|---|---|---|---|---|---|---|---|---|
| Example 1 | 6.5 | 5.2 | 138000 | 52000 | 2.7 | — | −30 | 31.3 | 21.6 | 4.07 | 5.63 | 0 | 0 |
| Comparative Example 1 | 6.0 | 4.80 | 127000 | 47500 | 2.7 | 29 | −35 | 23 | 14.95 | 4.14 | 3.91 | 0 | 0 |
| Comparative Example 2 | 4.5 | 3.60 | 58000 | 21000 | 2.8 | 35/125 | −40 | 10 | 4.5 | 3.6 | 1.9 | 0 | 0 |
| Comparative Example 3 | 4.8 | 3.84 | 62000 | 30200 | 2.1 | 120 | −38 | 9.9 | 5.2 | 3.5 | 1.2 | 0 | 0 |
| Example 2 | 0.8 | 0.64 | 45600 | 19800 | 2.3 | — | −29 | 34.13 | 25.6 | 5.46 | 3.07 | 0 | 0 |
| Comparative Example 4 | 0.6 | 0.48 | 38000 | 17500 | 2.2 | — | −31 | 23 | 15.87 | 2.99 | 4.14 | 0 | 0 |
| Comparative Example 5 | 0.7 | 0.56 | 41000 | 19000 | 2.2 | 35 | −32 | 16 | 6.2 | 5.1 | 4.7 | 0 | 0 |
| Example 3 | 0.8 | 0.64 | 41000 | 20500 | 2.0 | — | −22 | 31 | 26.35 | 2.17 | 2.48 | 0 | 0 |
| Comparative Example 6 | 0.6 | 0.48 | 37000 | 17500 | 2.1 | 35 | −33 | 14 | 9.8 | 2.24 | 1.96 | 0 | 0 |
| Example 4 | 3.1 | 2.48 | 48000 | 16800 | 2.9 | — | −30 | 33.57 | 23.5 | 5.71 | 4.36 | 0 | 0 |
| Comparative Example 7 | 2.8 | 2.24 | 42500 | 15600 | 2.7 | — | −33 | 17 | 9.86 | 3.74 | 3.4 | 0 | 0 |
| Comparative Example 8 | 2.4 | 1.92 | 41000 | 14500 | 2.8 | 30 | −35 | 13 | 7.15 | 3.25 | 2.6 | 0 | 0 |
| Comparative Example 9 | 3.0 | 2.4 | 45000 | 23000 | 2.0 | 32 | −36 | 16 | 8.2 | 4.6 | 3.2 | 0 | 0 |
| Example 5 | 5.8 | 4.64 | 49000 | 26000 | 1.9 | — | −28 | 31.54 | 20.5 | 4.10 | 6.94 | 0 | 0 |
| Comparative Example 10 | 5.2 | 4.16 | 35000 | 16700 | 2.1 | 34 | −32 | 15 | 9.0 | 1.95 | 4.05 | 0 | 0 |
| Comparative Example 11 | 4.1 | 3.28 | 35000 | 17000 | 2.1 | 120 | −39 | 11 | 4.8 | 2.9 | 3.3 | 0 | 0 |
| Example 6 | 6.3 | 5.04 | 59000 | 38000 | 1.6 | — | −29 | 31.2 | 23.4 | 5.30 | 2.50 | 0 | 0 |
| Comparative Example 12 | 12.0 | 9.60 | 230000 | 100000 | 2.3 | 105 | — | 4.51 | 0 | 1.04 | 3.47 | 0 | 0 |
| Comparative Example 13 | 2.5 | 2.00 | 120000 | 57000 | 2.1 | 102 | — | 6 | 0.12 | 1.5 | 4.38 | 0 | 0 |

The results in Table 2 confirmed that the ethylene copolymer according to the present disclosure not only has an increased molecular weight and a narrow molecular weight distribution index, but also has an increased content of conjugated diene structural unit, while a backbone of the ethylene copolymer is substantially free of unsaturated groups. The results in Table 2 also confirmed that the olefin polymerization method according to the present disclosure, not only can the ethylene copolymer according to the present disclosure be prepared, but also an increased catalyst activity can be obtained, thereby increasing the production efficiency.

Test Examples 1-2

The ethylene copolymers prepared in Examples 2 and 4 were respectively blended with carbon black, peroxide and vulcanization aid in an open mill according to formulas shown in Table 3. The vulcanization properties of blends were tested by using a MDR vulcanizer purchased from Alpha Technology Company at a temperature of 160° C., and a vulcanization rate was evaluated, wherein the test time was 20 min. The test results are listed in Table 4.

Comparative Test Examples 1-2

The vulcanization properties of the ethylene copolymers prepared in Comparative Examples 5 and 9 were respectively tested by the same method as that in Test examples 1-2, and the test results are shown in Table 4.

TABLE 3

| No. | Test Example 1 | Comparative Test Example 1 | Test Example 2 | Comparative Test Example 2 |
|---|---|---|---|---|
| Source and usage amount of ethylene copolymer | Example 2 100 parts by weight (phr) | Comparative Example 5 100 phr | Example 4 100 phr | Comparative Example 9 100 phr |
| Usage amount of carbon black N550 | 15 phr | 15 phr | 15 phr | 15 phr |
| Usage amount of dicumyl peroxide | 5 phr | 5 phr | 5 phr | 5 phr |
| Usage amount of triallylisocyanurate | 1 phr | 1 phr | 1 phr | 1 phr |

TABLE 4

| No. | Test Example 1 | Comparative Test Example 1 | Test Example 2 | Comparative Test Example 2 |
|---|---|---|---|---|
| $t_c10$ (min) | 0.5 | 1.1 | 0.7 | 0.9 |
| $t_c90$ (min) | 8.5 | 13.2 | 8.6 | 12.1 |
| MH (dNm) | 92.3 | 45.1 | 90.5 | 56.8 |
| ML (dNm) | 0.5 | 0.6 | 0.5 | 0.7 |

As can be seen from the test results of vulcanization properties in Table 4, the ethylene copolymer according to the present disclosure has a faster torque increase during vulcanization, a faster vulcanization rate and a higher degree of vulcanization.

Preferred embodiments of the present disclosure are described above in detail, but the present disclosure is not limited thereto. Within the technical concept range of the present disclosure, the technical solution of the present disclosure can be subjected to various simple variations, including the combination of various technical features in any other suitable manner, and these simple variations and combinations should likewise be considered as the contents disclosed by the present disclosure, and all fall within the protection scope of the present disclosure.

The invention claimed is:

1. An ethylene copolymer, wherein the ethylene copolymer comprises an ethylene structural unit derived from ethylene and a conjugated diene structural unit derived from a conjugated diene; based on the total amount of the ethylene copolymer, the content of the conjugated diene structural unit is 30-45 mol %, and the content of a 1,2-polymerized vinyl structural unit formed by 1,2-polymerization of the conjugated diene and having side chain double bonds is 20-40 mol %; the total amount of a 1,2-polymerized structural unit is 95 mol % or more based on the total amount of the conjugated diene structural unit in the ethylene copolymer, and the ethylene copolymer has a weight average molecular weight of 30,000 to 300,000, wherein 1,2-polymerized structural unit comprises a 1,2-polymerized vinyl structural unit formed by 1,2-polymerization of the conjugated diene and having side chain double bonds, a 1,2-cyclopropane ring structural unit formed by 1,2-polymerization of the conjugated diene and having a cyclopropane ring, and a 1,2-cyclopentane ring structural unit formed by 1,2-polymerization of the conjugated diene and having a cyclopentane ring.

2. The ethylene copolymer according to claim 1, wherein the content of the 1,2-polymerized vinyl structural unit is 20-35 mol % based on the total amount of the ethylene copolymer, or
- the content of the 1,2-polymerized vinyl structural unit is 21-30 mol % based on the total amount of the ethylene copolymer.

3. The ethylene copolymer according to claim 1, wherein the content of the 1,2-polymerized vinyl structural unit is 55-90% based on the content of the conjugated diene structural unit, or
- the content of the 1,2-polymerized vinyl structural unit is 60-88% based on the content of the conjugated diene structural unit, or
- the content of the 1,2-polymerized vinyl structural unit is 63-85% based on the content of the conjugated diene structural unit.

4. The ethylene copolymer according to claim 1, wherein the total amount of the 1,2-polymerized structural unit is 98 mol % or more based on the total amount of the conjugated diene structural unit in the ethylene copolymer, or
- the total amount of the 1,2-polymerized structural unit is 100 mol % based on the total amount of the conjugated diene structural unit in the ethylene copolymer.

5. The ethylene copolymer according to claim 1, wherein the content of the conjugated diene structural unit is 30-40 mol % based on the total amount of the ethylene copolymer, or
- the content of the conjugated diene structural unit is from 30-35 mol % based on the total amount of the ethylene copolymer.

6. The ethylene copolymer according to claim 1, wherein a molar ratio of a 1,2-cyclopentane ring structural unit to a 1,2-cyclopropane ring structural unit in the conjugated diene structural unit of the copolymer is 0.1-3:1, or
- a molar ratio of a 1,2-cyclopentane ring structural unit to a 1,2-cyclopropane ring structural unit in the conjugated diene structural unit of the copolymer is 0.3-2.5:1, or
- a molar ratio of a 1,2-cyclopentane ring structural unit to a 1,2-cyclopropane ring structural unit in the conjugated diene structural unit of the copolymer is 0.4-2:1, or
- a molar ratio of a 1,2-cyclopentane ring structural unit to a 1,2-cyclopropane ring structural unit in the conjugated diene structural unit of the copolymer is 0.5-1.8:1.

7. The ethylene copolymer according to claim 1, wherein the ethylene copolymer has a weight average molecular weight of 30,000 to 250,000, or
- the ethylene copolymer has a weight average molecular weight of 30,000 to 200,000, or
- the ethylene copolymer has a weight average molecular weight of 40,000 to 150,000; or
- the copolymer has a molecular weight distribution index of 3.5 or less, or
- the copolymer has a molecular weight distribution index of 3.2 or less, or
- the copolymer has a molecular weight distribution index of 1.5-3.

8. The ethylene copolymer according to claim 1, wherein the glass transition temperature of the ethylene copolymer is in the range of −50° C. to −15° C., or
- the glass transition temperature of the ethylene copolymer is in the range of from −40° C. to −20° C.

9. The ethylene copolymer according to claim 1, wherein the conjugated diene is butadiene.

10. A method for the preparation of an ethylene copolymer, comprising contacting ethylene with a conjugated diene in the presence of a polymerization catalyst, wherein the polymerization catalyst comprises a component A and a component B, the component A is selected from metal compounds of Formula 1, (Formula 1)

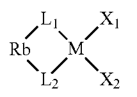

in Formula 1, M is a metal atom selected from a Group IVB, $X_1$ and $X_2$ are the same or different, and are each independently a halogen atom, Rb is a Group IVA element-containing divalent group, $L_1$ and $L_2$ are the same or different, and are each independently selected from groups represented by Formulae 3 to 6, Formula 3

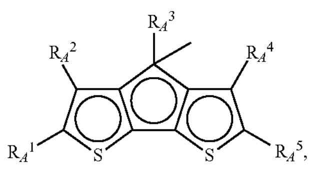

Formula 4

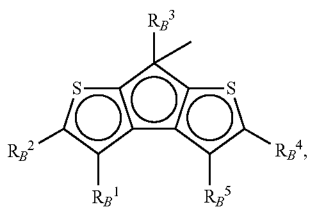

Formula 5

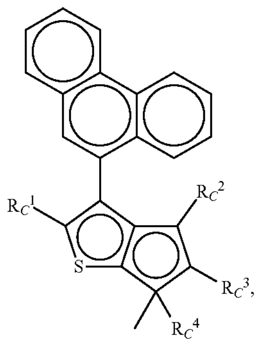

Formula 6

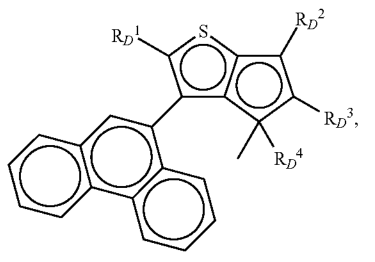

in Formula 3, $R_A^1$, $R_A^2$, $R_A^3$, $R_A^4$ and $R_A^5$ are the same or different, and are each independently a hydrogen atom or $C_1$-$C_{20}$ alkyl, in Formula 4, $R_B^1$, $R_B^2$, $R_B^3$, $R_B^4$ and $R_B^5$ are the same or different, and are each independently a hydrogen atom or $C_1$-$C_{20}$ alkyl, in Formula 5, $R_C^1$, $R_C^2$, $R_C^3$ and $R_C^4$ are the same or different, and are each independently a hydrogen atom or $C_1$-$C_{20}$ alkyl, and in Formula 6, $R_{MICHIUE}$, $R_D^2$, $R_D^3$ and $R_D^4$ are the same or different, and are each independently a hydrogen atom or $C_1$-$C_{20}$ alkyl; and the component B comprises an aluminoxane.

11. The method according to claim 10, wherein in Formula 1, M is a zirconium atom; and/or in Formula 1, $X_1$ and $X_2$ are both chlorine atom.

12. The method according to claim 10, wherein in Formula 1, Rb is a divalent group containing silicon, or in Formula 1, Rb is a divalent group of Formula 2, (Formula 2)

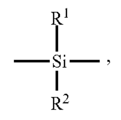

wherein $R^1$ and $R^2$ are the same or different, and are each independently a $C_1$-$C_{10}$ alkyl.

13. The method according to claim 10, wherein the component A is one or two or more selected from metal compounds of Formulae 7 to 10:

Formula 7

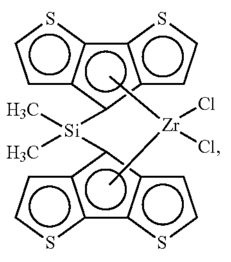

Formula 8

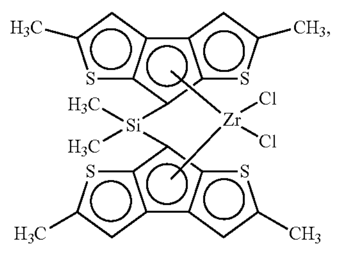

-continued

Formula 9

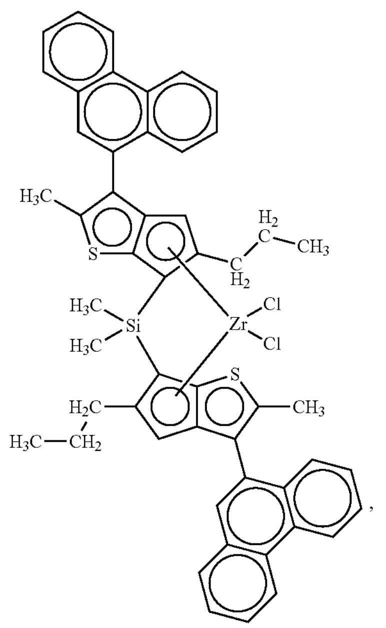

,

Formula 10

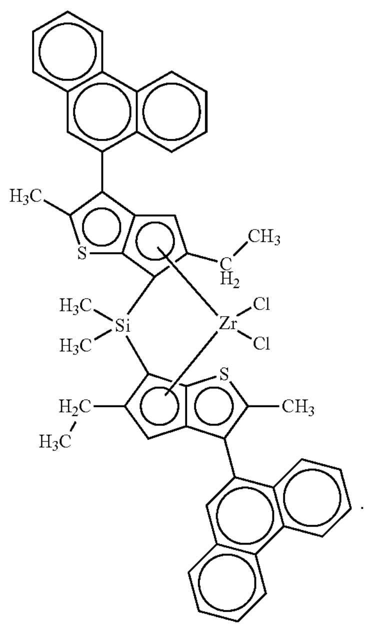

.

14. The method according to claim 10, wherein a molar ratio of the component A to the component B is 1:0.1-5000; or the component A is used in an amount of 0.1-100 μmol relative to 1 mol of the conjugated diene.

15. The method according to claim 10, wherein the conjugated diene is butadiene.

16. The method according to claim 10, wherein the contacting is carried out at a temperature of −50° C. to 150° C., and the pressure of ethylene is 0-100 MPa, the pressure being a gauge pressure; or the contacting is carried out in the presence of a molecular weight regulator, and the molecular weight regulator is used in an amount so that the prepared ethylene copolymer has a weight average molecular weight of 30,000 to 300,000, or the contacting is carried out in the presence of a molecular weight regulator, and the molecular weight regulator is used in an amount so that the prepared ethylene copolymer has a weight average molecular weight of 25,000 to 250,000, or the contacting is carried out in the presence of a molecular weight regulator, and the molecular weight regulator is used in an amount so that the prepared ethylene copolymer has a weight average molecular weight of 30,000 to 200,000, or the contacting is carried out in the presence of a molecular weight regulator, and the molecular weight regulator is used in an amount so that the prepared ethylene copolymer has a weight average molecular weight of 40,000 to 150,000.

17. An ethylene copolymer, prepared by the method according to claim 10.

18. A composition, comprising an ethylene copolymer and a crosslinking agent, wherein the ethylene copolymer is the ethylene copolymer according to claim 1.

19. A crosslinked polymer, formed by crosslinking the ethylene copolymer according to claim 1.

20. A tire, having at least one constituent element comprising the ethylene copolymer according to claim 1.

* * * * *